United States Patent [19]

Seed

[11] Patent Number: 5,038,560
[45] Date of Patent: Aug. 13, 1991

[54] FLUID OUTLET DUCT

[75] Inventor: Bernard E. Seed, Nottingham, United Kingdom

[73] Assignee: Rolls-Royce PLC, London, England

[21] Appl. No.: 392,893

[22] Filed: Aug. 14, 1989

[30] Foreign Application Priority Data

Oct. 22, 1988 [GB] United Kingdom ............... 8824798

[51] Int. Cl.$^5$ ............................................. F02K 3/04
[52] U.S. Cl. ................................... 60/226.1; 60/242; 60/263; 60/271; 60/39.83; 239/265.37
[58] Field of Search .................. 60/226.1, 242, 263, 60/271, 39.07, 39.83; 239/265.27, 265.25, 265.33, 265.37

[56] References Cited

U.S. PATENT DOCUMENTS

| | | | |
|---|---|---|---|
| 3,769,797 | 11/1973 | Stevens | 60/226.1 |
| 4,086,761 | 5/1978 | Schaut et al. | 60/226.1 |
| 4,254,618 | 3/1981 | Elovic | 60/226.1 |
| 4,310,121 | 1/1982 | Basinski, Jr. | 239/265.33 |
| 4,463,902 | 8/1984 | Nightingale | 239/265.37 |
| 4,474,001 | 10/1984 | Griffin et al. | 60/226.1 |
| 4,791,782 | 12/1988 | Seed | 60/226.1 |

FOREIGN PATENT DOCUMENTS

| | | |
|---|---|---|
| 781661 | 4/1955 | United Kingdom . |
| 1082947 | 8/1965 | United Kingdom . |
| 1194973 | 1/1968 | United Kingdom . |
| 2031523 | 6/1979 | United Kingdom . |
| 2046363 | 3/1980 | United Kingdom . |
| 2048387 | 3/1980 | United Kingdom . |
| 2055333 | 3/1981 | United Kingdom ........... 239/265.37 |
| 2098280 | 5/1982 | United Kingdom . |

*Primary Examiner*—Donald E. Stout

[57] ABSTRACT

A cooling air outlet duct for a heat exchanger of a gas turbine engine is provided with a rotatable wall portion. The rotatable wall portion is rotatable about a pivot positioned at its upstream end so that the total flow area between the downstream end of the rotatable wall portion and a first wall of the fluid outlet duct and the fluid flow rate may be varied to obtain relatively high exit velocities for the cooling air discharging from an exit nozzle in a fan casing to give good thrust recovery. This produces a lightweight and uncomplicated valve for the fluid outlet duct.

12 Claims, 2 Drawing Sheets

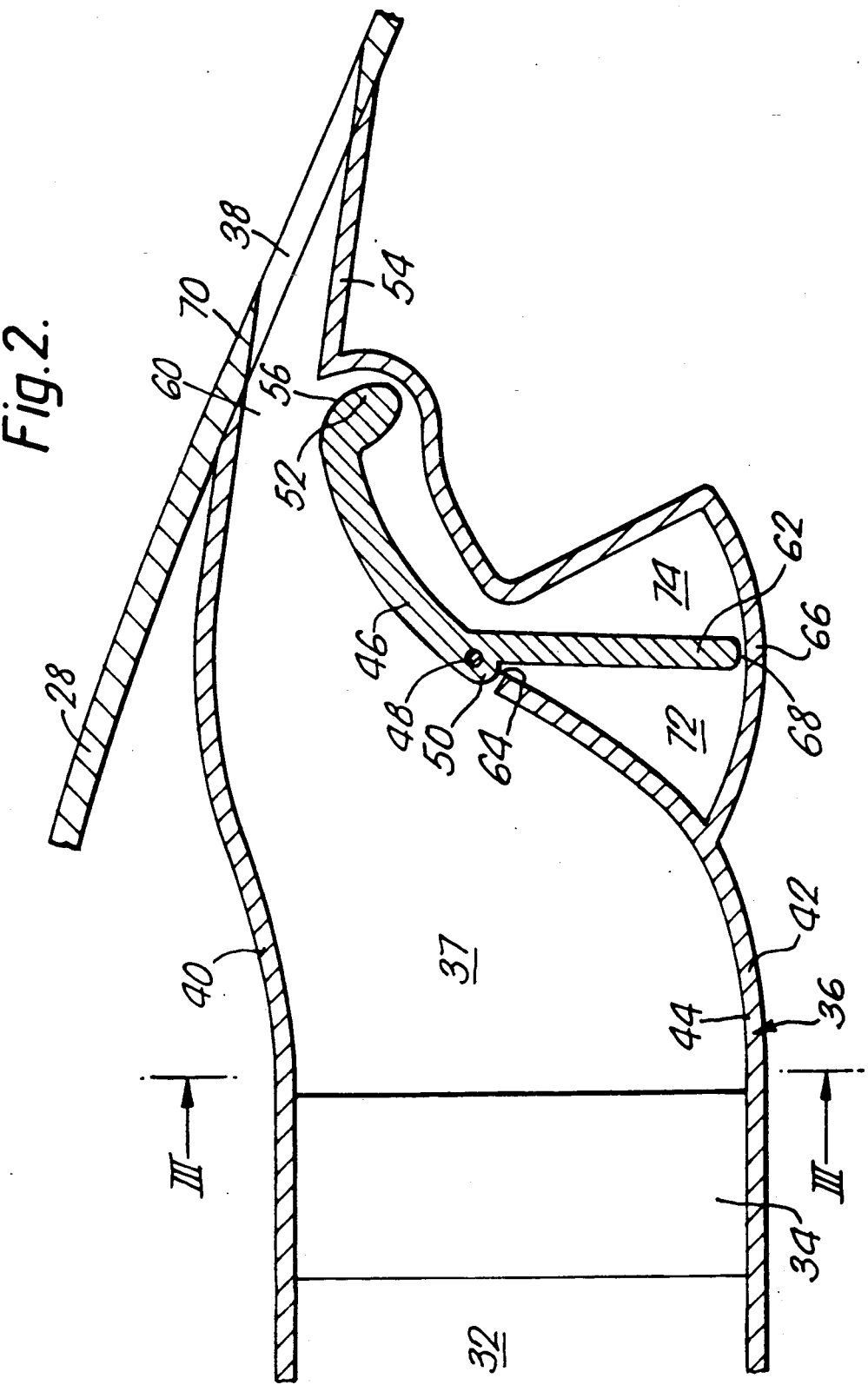

FLUID OUTLET DUCT

The present invention relates to fluid outlet ducts, particularly air outlet ducts of heat exchangers of a gas turbine engine.

The accessory gearbox, gearbox, generators etc of a gas turbine engine are cooled by cooling air supplied from a fan, compressor or compressors of the gas turbine engine. The cooling air generally passes through a heat exchanger and is then directed through ducting to an exit nozzle in the engine casing to give thrust recovery.

One of the problems associated with this type of arrangement is that minimising of the cooling airflow to just satisfy the minimum cooling requirements, by the use of any commonly available valve, has a result that the exit velocity of the cooling air discharging from the exit nozzle will be relatively low for most normal conditions. Consequently the thrust recovery of this arrangement is relatively low for these conditions.

Our prior published patent application GB2194592A discloses an outlet duct system for a gas turbine engine which is divided into a number of plenum chambers. Each of the plenum chambers has a valve and separate exit nozzle. These valves could vary the total flow area of the fluid outlet duct to obtain relatively high exit velocities for the fluid discharging from each of the exit nozzles to give good thrust recovery.

However the construction described in the above mentioned disclosure is relatively heavy and complicated due to the dividing of the fluid duct and the use of a number of valves.

The present invention seeks to provide an outlet duct which has relatively high exit velocities for the cooling air for thrust recovery and which is relatively simple and relatively lightweight.

Accordingly the present invention provides a fluid outlet duct for a heat exchanger of a gas turbine engine comprising a plenum chamber arranged to be supplied with cooling fluid from the heat exchanger, the plenum chamber having an exit nozzle located in a casing of the gas turbine engine, the plenum chamber being defined by a first wall, a second wall and sidewalls, the second wall being spaced from the first wall, the side walls being secured to the first wall and the second wall, the first wall determining the direction of the fluid flow through the exit nozzle, the second wall having a rotatable wall portion, the rotatable wall portion being rotatable about a pivot whereby the total flow area between the rotatable wall portion and the first wall and the fluid flow rate are variable to obtain relatively high exit velocities for the fluid discharging from the exit nozzle of the plenum chamber to give good thrust recovery.

The second wall may comprise an upstream wall portion, a rotatable intermediate wall portion and a downstream wall portion.

The rotatable wall portion may be aerodynamically shaped.

The rotatable wall portion may have an upstream end and a downstream end, the rotatable wall portion is pivoted at its upstream end.

The downstream end of the rotatable wall portion may have a curved surface of relatively large radius such that fluid flow accelerations or decelerations in the region of the minimum total flow area are minimised where the tangent to the curved surface is substantially parallel to the first radially outer wall.

The rotatable wall portion may have a balancing member to balance any forces acting on the rotatable wall portion.

Sealing means may be provided between the upstream wall portion and the rotatable intermediate wall portion.

A part cylindrical wall may at least partially enclose the balancing member.

Sealing means may be provided between the balancing member and the part cylindrical wall.

The first wall may have a downstream wall portion in the region of the exit nozzle, the downstream wall portion is substantially straight to determine the direction of the fluid flow through the exit nozzle, the downstream wall portion of the second wall is substantially parallel to the downstream wall portion of the first wall.

The fluid duct may discharge cooling air from a heat exchanger for a gearbox, an accessory gearbox or a generator.

The fluid outlet duct may be positioned in the fan casing of a turbofan gas turbine engine.

The present invention will be more fully described by way of example, with reference to the accompanying drawings, in which:

FIG. 2 is an enlarged longitudinal section through the outlet duct shown in FIG. 1.

Figure 1:
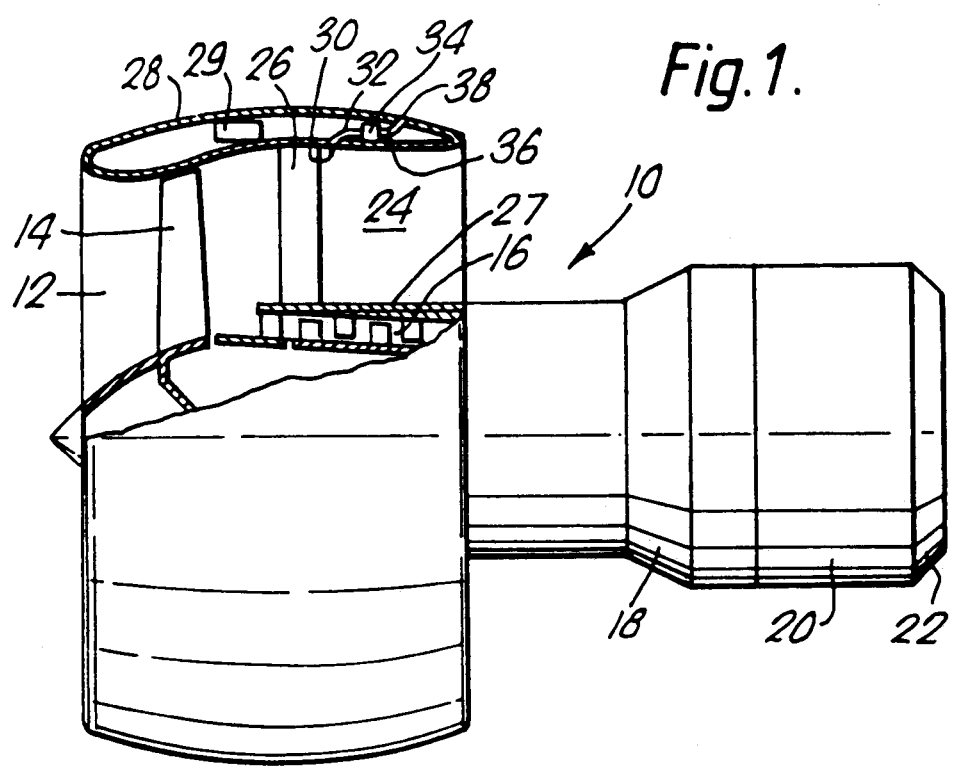
FIG. 1 is a partially cut away view of a gas turbine engine showing an outlet duct according to the present invention.

A turbofan gas turbine engine 10 is shown in FIG. 1 and comprises in axial flow series an inlet 12, a fan 14, a compressor or compressors 16, a combustor 18, a turbine 20 and an exhaust nozzle 22. The fan operates in a fan duct 24 partially defined by a fan casing 28 which encloses the fan duct 24. The fan casing 28 is secured to the core engine casing 27 by a plurality of circumferentially arranged outlet guide vanes 26. The turbofan operates conventionally in that air is initially compressed by the fan 14 and a portion of the air flows into the compressor 16. This air is further compressed and is supplied to the combustor 18 where fuel is burnt in the compressed air to produce hot gases which drive the turbines 20 before passing to the atmosphere through the exhaust nozzle 22. The remainder of the air compressed by the fan flows through the fan duct 24 to provide thrust. The turbines 20 drive the compressor 16 and fan 14 via shafts (not shown).

The turbofan gas turbine engine 10 also has accessory gearboxes and generators 29 which are positioned on the fan casing 28. The accessory gearbox or generator 29 is cooled by passing the accessory gearbox or generator lubricant, i.e. oil through a heat exchanger 34, and cooling air passing through the heat exchanger 34 removes heat from the lubricant. The cooling air is tapped from the fan duct 24, through an opening 30 in the interior surface of the fan casing 28, and flows through a supply duct 32 to the heat exchanger 34. The cooling air, after passing through the heat exchanger 34, is then directed through an outlet duct 36 to an exit nozzle 38 in the exterior surface of the fan casing 28.

Figure 3:
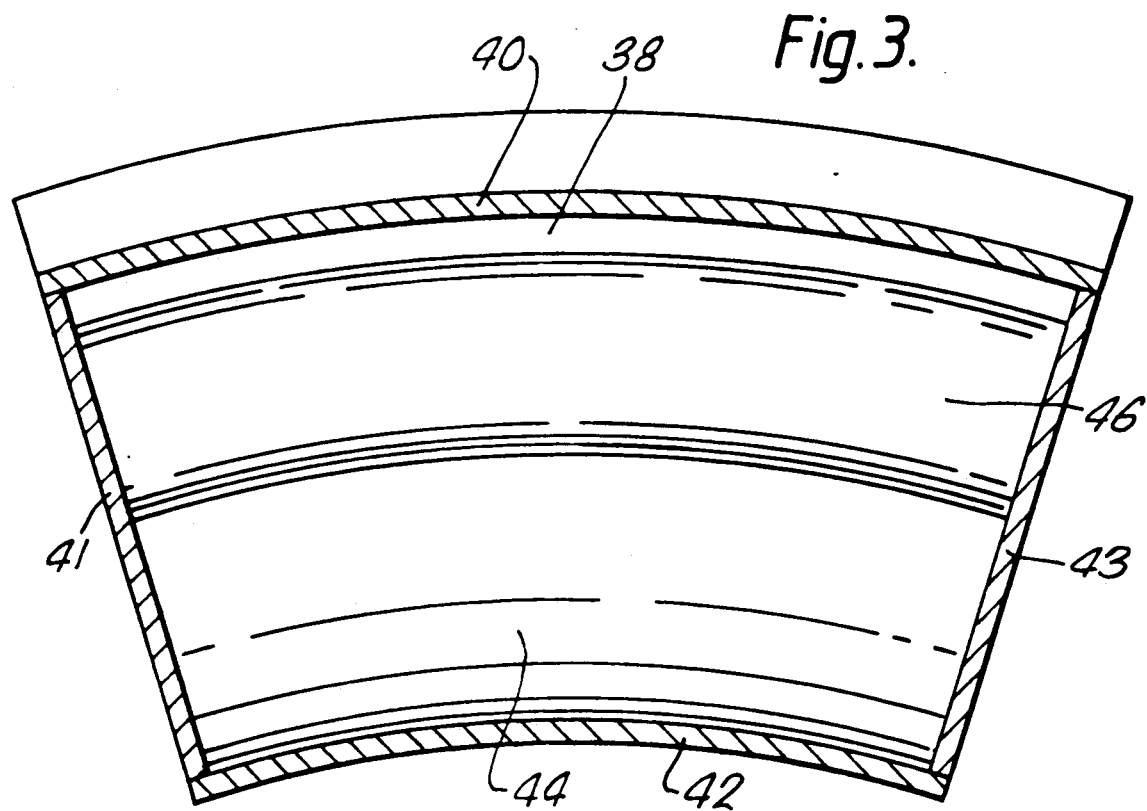
FIG. 3 is a cross-sectional view in the direction of arrows A in FIG. 2.

The outlet duct 36 according to the present invention is shown in FIGS. 2 and 3 and comprises a plenum chamber 37 defined by a first radially outer wall 40, a second radially inner wall 42 spaced radially from the first radially outer wall 40 and side walls 41 and 43 which extend generally radially between and are secured to the first and second walls 40 and 42 respectively. The plenum chamber 37 has the same longitudinal cross-sectional aerodynamic shape as the prior art.

The second radially inner wall 42 comprises an upstream wall portion 44, an intermediate wall portion 46 and a downstream wall portion 54, the upstream wall portion 44 and the downstream wall portion 54 are fixed, but the intermediate wall portion 46 is rotatably mounted about a pivot 48 to the sidewalls 41 and 43. The intermediate wall portion 46 is pivoted at its upstream end 50, and the downstream end 52 of the intermediate wall portion 46 has a curved surface 56 of relatively large radius. The intermediate wall portion 46 also has a balancing member 62, which does not define a portion of the plenum chamber 37. The balancing member 62 is enclosed by a part cylindrical wall 66 and a wall 76 interconnecting with the downstream wall portion 54. A seal 64 is provided between the upstream end 50 of the intermediate wall portion 46 and the upstream wall portion 44, and a seal 68 is provided between the balancing member 62 and the part cylindrical wall 66. The seal 64 is positioned on the upstream wall portion 44 and the seal 68 is positioned on the end of the balancing member 62.

The intermediate wall portion 46 is aerodynamically shaped and forms a variable area throat 60 with the first radially outer wall 40. The first radially outer wall 40 has a downstream wall portion 70 which is substantially straight. The downstream wall portion 54 of the second radially inner wall 42 is substantially parallel to the downstream wall portion 70 of the first radially outer wall 40.

A first chamber 72 is formed between the upstream wall portion 44 of the second radially inner wall 42, the part cylindrical wall 66 and the balancing member 62 and a second chamber 74 is formed between the balancing member 62, the part cylindrical wall 66 and a wall 76.

In operation the intermediate wall portion 46 of the second radially inner wall 42 is rotated about its pivot 48 to vary the flow area 60 between the intermediate wall portion 46 and the first radially outer wall 40 and to vary the flow rate of fluid through the exit nozzle 38. The intermediate wall portion 46 is rotated about its pivot 48 towards the first radially outer wall 40 to close or partially close, i.e. decrease, the flow area 60, and on the contrary the intermediate wall portion 46 is rotated about its pivot 48 away from the first radially outer wall 40 to increase the flow area 60. The downstream end 52 of the intermediate wall portion 46 has a surface 56 with a large radius, not necessarily of constant radius, such that fluid flow accelerations and decelerations in the region of the minimum controlling flow area 60 are minimised where the tangent to the curved surface is substantially parallel to the downstream end 70 of the first radially outer wall 40.

The outlet duct 36 will allow the minimum cooling airflow to just satisfy the minimum cooling requirements of the accessory gearbox, gearbox or generators without reducing the exit velocity of the cooling air to relatively low values. At minimum cooling airflow the intermediate wall portion 46 is in a position to define a relatively small flow area 60 between the intermediate wall portion 46 and the first radially outer wall 40 to allow greater cooling airflow velocities and good thrust recovery.

As the cooling requirement for the accessory gearbox, gearbox and generator increases the intermediate wall portion 46 is rotated to gradually increase the flow area 60 between the intermediate wall portion 46 and the first radially outer wall 40 while maintaining the high airflow velocities and good thrust recovery.

The downstream end 70 of the first radially outer wall 40 is substantially straight such that the angle of the cooling fluid jet efflux through the exit nozzle 38 is limited by the angle of the downstream end 70 of the first radially outer wall 40 to the axis of the turbofan gas turbine engine 10.

Thus the downstream end 70 of the first radially outer wall 40 determines the direction of the cooling fluid flow through the exit nozzle 38, and the intermediate wall portion 46 of the second radially inner wall 42 functions as a valve to control the total flow area of the exit nozzle and the cooling fluid flow rate.

The balancing member 62 balances the forces acting on the intermediate wall portion 46. The seal 64 reduces leakage from the plenum chamber 37 into the first chamber 72 between the upstream wall portion 44 and intermediate wall portion 46 and the seal 68 reduces leakage from the first chamber 72 to the second chamber 74 between the balancing member 62 and the part cylindrical wall 66. Any cooling fluid leaking into second chamber 74 flows over the radially inner surface of the intermediate wall portion 46 and through the exit nozzle 38.

The invention maximises the cooling airflow velocities at the exit nozzle while maintaining the required cooling airflow direction through all positions of the intermediate wall portion 46, and minimises weight space and complication of the fluid duct.

I claim:

1. A fluid outlet duct for a heat exchanger of a gas turbine engine comprising a plenum chamber arranged to be supplied with cooling fluid from the heat exchanger, the plenum chamber having an exit nozzle located in a casing of the gas turbine engine, the plenum chamber being defined by a first wall, a second wall and sidewalls, the second wall being spaced from the first wall, the side walls being secured to the first wall and the second wall, the first wall having a downstream wall portion in the region of the exit nozzle, the downstream wall portion of the first wall determining the direction of the fluid flow through the exit nozzle, the second wall having a rotatable wall portion, the rotatable wall portion being rotatable about a pivot whereby the total flow area between the rotatable wall portion and the first wall and the fluid flow rate are variable to obtain relatively high exit velocities for the fluid discharging from the exit nozzle of the plenum chamber to give good thrust recovery.

2. A fluid outlet duct for a heat exchanger as claimed in claim 1 in which the second wall comprises an upstream wall portion, a rotatable intermediate wall portion and a downstream wall portion.

3. A fluid outlet duct for a heat exchanger as claimed in claim 2 in which sealing means are provided between the upstream wall portion and the rotatable intermediate wall portion.

4. A fluid outlet duct for a heat exchanger as claimed in claim 1 in which the rotatable wall portion is aerodynamically shaped.

5. A fluid outlet duct for a heat exchanger as claimed in claim 1 in which the rotatable wall portion has an upstream end and a downstream end, the rotatable wall portion is pivoted at its upstream end.

6. A fluid outlet duct for a heat exchanger as claimed in claim 5 in which the downstream end of the rotatable wall portion has a curved surface of relatively large radius such that fluid flow accelerations or decelerations in the region of the minimum total flow area are minimised where the tangent to the curved surface is substantially parallel to the first radially outer wall.

7. A fluid outlet duct for a heat exchanger as claimed in claim 1 in which the rotatable wall portion has a balancing member to balance any forces acting on the rotatable wall portion.

8. A fluid outlet duct for a heat exchanger as claimed in claim 6 in which a part cylindrical wall at least partially encloses the balancing member.

9. A fluid outlet duct for a heat exchanger as claimed in claim 8 in which sealing means are provided between the balancing member and the part cylindrical wall.

10. A fluid outlet duct for a heat exchanger as claimed in claim 1 in which the downstream wall portion is substantially straight to determine the direction of the fluid flow through the exit nozzle, the downstream wall portion of the second wall is substantially parallel to the downstream wall portion of the first wall.

11. A fluid outlet duct for a heat exchanger as claimed in claim 1 in which the fluid duct discharges cooling air from a heat exchanger for a gearbox, an accessory gearbox or a generator.

12. A fluid outlet duct for a heat exchanger as claimed in claim 11 in which the fluid outlet duct is positioned in the fan casing of a turbofan gas turbine engine.

* * * * *